US012659642B2

(12) United States Patent
Kolberg et al.

(10) Patent No.: US 12,659,642 B2
(45) Date of Patent: Jun. 16, 2026

(54) MICROPHONE COMPONENT AND METHOD OF MANUFACTURE

(71) Applicant: SENSIBEL AS, Oslo (NO)

(72) Inventors: Sigbjørn Kolberg, Oslo (NO); Matthieu Lacolle, Nesøya (NO); Ola Finneng Myhre, Haslum (NO); Håkon Sagberg, Oslo (NO); Jakob Vennerød, Oslo (NO)

(73) Assignee: SENSIBEL AS, Oslo (NO)

( * ) Notice: Subject to any disclaimer, the term of this patent is extended or adjusted under 35 U.S.C. 154(b) by 654 days.

(21) Appl. No.: 17/997,192

(22) PCT Filed: Apr. 27, 2021

(86) PCT No.: PCT/GB2021/051019
§ 371 (c)(1),
(2) Date: Oct. 26, 2022

(87) PCT Pub. No.: WO2021/219994
PCT Pub. Date: Nov. 4, 2021

(65) Prior Publication Data
US 2023/0164470 A1      May 25, 2023

(30) Foreign Application Priority Data

Apr. 27, 2020      (GB) ..................................... 2006173

(51) Int. Cl.
*H01R 31/00*        (2006.01)
*G01B 9/02*        (2022.01)
(Continued)

(52) U.S. Cl.
CPC ........... *H04R 1/08* (2013.01); *G01B 9/02049* (2013.01); *G02F 1/0154* (2021.01); *G02F 1/292* (2013.01); *H04R 1/04* (2013.01)

(58) Field of Classification Search
CPC ...... H04R 31/006; H04R 23/008; H04R 1/04; H04R 1/08; G02F 1/0154; G02F 1/292; G01B 9/02049
See application file for complete search history.

(56) References Cited

U.S. PATENT DOCUMENTS 7,355,720 B1      4/2008   Carr
11,240,607 B2 *   2/2022   Angelskår .......... G01B 9/02051
(Continued)

FOREIGN PATENT DOCUMENTS

CN        101043762 A      9/2007
CN        106660074 A      5/2017
(Continued)

OTHER PUBLICATIONS

Japan Patent Office, Notice of Reasons for Refusal in related JP Application 2022-565689, mailed Apr. 22, 2025. 12 pages (w/ translation).
(Continued)

*Primary Examiner* — Paul D Kim
(74) *Attorney, Agent, or Firm* — Heslin Rothenberg Farley & Mesiti P.C.; George S. Blasiak, Esq.

(57)        ABSTRACT

An optical microphone module for installation in a microphone assembly is described. The module is manufactured by assembling a semiconductor chip, a spacer and an interferometric component in a stack with the spacer disposed between the semiconductor chip and the interferometric component. The interferometric component comprises a membrane and a substrate comprising an optical element spaced from the membrane. The semiconductor chip comprises an optoelectronic circuit including at least one photo detector and has a light source mounted thereon or integrated therein. The light source is disposed to provide light to the interferometric arrangement such that two light portions propagate via respective optical paths to create an
(Continued)

interference pattern at the photo detector which is dependent on a position of the membrane. The stack comprises an internal cavity and at least one aperture providing a passage for air between the internal cavity and an exterior of the stack, such that the internal cavity is in fluid communication with the exterior of the stack. A first side of the membrane is in fluid communication with the exterior of the stack and a second side of the membrane is in fluid communication with the internal cavity.

20 Claims, 11 Drawing Sheets

(51) Int. Cl.

| | |
|---|---|
| *G02F 1/015* | (2006.01) |
| *G02F 1/29* | (2006.01) |
| *H04R 1/04* | (2006.01) |
| *H04R 1/08* | (2006.01) |

(56) References Cited

U.S. PATENT DOCUMENTS

| | | | | |
|---|---|---|---|---|
| 12,041,415 | B2 * | 7/2024 | Stojanovic | H04R 23/008 |
| 12,231,847 | B2 * | 2/2025 | LaColle | H04R 1/02 |
| 2002/0039463 | A1 | 4/2002 | Degertekin et al. | |
| 2004/0130728 | A1 | 7/2004 | Degertekin et al. | |
| 2005/0018541 | A1 | 1/2005 | Johansen et al. | |
| 2005/0105098 | A1 | 5/2005 | Johansen et al. | |
| 2006/0192976 | A1 | 8/2006 | Hall et al. | |
| 2006/0227845 | A1 | 10/2006 | Degertekin et al. | |
| 2007/0165896 | A1 | 7/2007 | Miles et al. | |
| 2011/0194711 | A1 | 8/2011 | Avenson et al. | |
| 2015/0146894 | A1 | 5/2015 | Ng | |
| 2016/0007125 | A1 | 1/2016 | Lee et al. | |
| 2016/0219375 | A1 | 7/2016 | Hall et al. | |
| 2021/0274291 | A1 | 9/2021 | Angelskår et al. | |

FOREIGN PATENT DOCUMENTS

| | | | |
|---|---|---|---|
| JP | 2007081614 | A | 3/2007 |
| JP | 2007124449 | A | 5/2007 |
| JP | 2011120170 | A | 6/2011 |
| JP | 2015177376 | A | 10/2015 |
| WO | WO 2003049494 | A1 | 6/2003 |
| WO | 2005086535 | A1 | 9/2005 |
| WO | WO 2010029509 | A1 | 10/2010 |
| WO | WO 2014202753 | A1 | 12/2014 |
| WO | 2019220103 | A1 | 11/2019 |

OTHER PUBLICATIONS

List of Foreign References and Their Translations, May 29, 2025 2 pages.

International Search Report and Written Opinion of International Application No. PCT/GB2021/051019, mailed on Jul. 15, 2021, 18 pages.

Hall et al., "Micromachined Broadband Acoustic Transducers with Integrated Optical Displacement Detection," Chapters 2, 3, and 9, 2004, pp. 8-46, XP055820166, https://smartech.catech.edu/bitstream/handle/1853/4858/hall_neal_a_200412_phd.pdf?sequence=1&isAllowed=y.

Carr, "MEMS and Optoelectronics Integration for Physical Sensors," 2007, XP055820299, pp. 1-8 http://citeseerx.ist.psu.edu/viewdoc/download?doi=10.1.1.583.7008&rep=repl&type=pdf.

Banser, "Micromachined Biomimetic Optical Microphones with Improved Packaging and Power Consumption," Chapter 2, 2012, pp. 22-56 https://smartech.gatech.edu/bitstream/handle/1853/43696/banser_fredric_a_201205mast.pdf?sequence=lisAllowed=y.

Hall et al., "Micromachined microphones with diffraction-based optical displacement detection," The Journal of the Acoustical Society of America, American Institute of Physics for the Acoustical Society of America, 2005, vol. 118(5): pp. 3000-3009.

China National Intellectual Property Administration, First Office Action in corresponding CN Application 202180031102.8, mailed May 31, 2025. 20 pages (w/translation).

List of Foreign References and Their Translations, dated Jul. 18, 2025. 2 pages.

Japan Patent Office, Notice of Refusal in counterpart JP Application 2022565689 dated Aug. 13, 2025. 12 pages (w/ translation).

List of Foreign References and Their Translations, dated Sep. 25, 2025. 2 pages.

* cited by examiner

MICROPHONE COMPONENT AND METHOD OF MANUFACTURE

CROSS REFERENCE TO RELATED APPLICATIONS

This application is a national stage filing under section 371 of International Application No. PCT/GB2021/051019 filed on Apr. 27, 2021 and published on Nov. 4, 2021 as WO 2021/219994 A1, which claims priority to United Kingdom Application No. 2006173.5 filed on Apr. 27, 2020. The entire contents of WO 2021/219994 A1 are hereby incorporated herein by reference.

BACKGROUND OF THE INVENTION

This invention relates generally to optical microphones, and in particular to components for optical microphones and methods of manufacture of such components.

Microphones are used to convert sound waves into electrical signals, typically by measuring the displacement of a moveable member (e.g. a membrane) that vibrates in response to ambient acoustic vibrations. There are a number of ways of measuring the displacement of such a moveable member, including capacitive readout (commonly called condenser microphones) and electrostatic or electromagnetic readout mechanisms (e.g. dynamic microphones).

An alternative way of reading out the position of a microphone membrane is optical interferometric read out. In typical examples of such systems, a diffraction grating is provided adjacent to a membrane, and electromagnetic radiation is directed onto the diffraction grating. A first portion of the light is reflected back from the grating. A second portion is transmitted through the grating, which diffracts the radiation. The diffracted radiation impinges on the membrane, which reflects it onto the grating. The radiation passes through the grating and the two portions of light interfere to create an interference pattern that can be detected by a detector. The interference pattern has a shape (i.e. spatial distribution) matching the diffraction orders of the grating, but the light intensity directed into these diffraction orders depends on the relative phase of the two portions of light, and therefore on the distance between the grating and the membrane. The position (and therefore the movement) of the membrane can thus be determined from changes in the intensity of the light at the detector.

In such optical microphone arrangements, the membrane is typically mounted in a housing to form an optical microphone assembly, where the membrane is arranged such that one side of the membrane is in fluid communication with the exterior of the microphone assembly and the other side of the membrane is in fluid communication with an enclosed acoustic cavity (commonly referred to as a back volume) in the microphone assembly. An incoming acoustic wave then exerts a force only on the side of the membrane in fluid communication with the exterior, creating a pressure differential causing the membrane to vibrate.

Optical microphones have a high signal to noise ratio (SNR) and high sensitivity. However, owing to the length scale of the physical processes involved in optical readout methods as discussed above, optical microphones typically comprise small components (e.g. on the scale of micrometres) which can present significant challenges in manufacture.

BRIEF DESCRIPTION OF THE INVENTION

The invention provides a method of manufacturing an optical microphone module for installation in a housing to form an optical microphone assembly, wherein the optical microphone module comprises:

an interferometric component comprising a substrate, a membrane and at least one optical element spaced from the membrane, wherein the at least one optical element comprises a surface of the substrate and/or is disposed on a surface of the substrate;

a semiconductor chip comprising an optoelectronic circuit including at least one photo detector;

a light source mounted on the semiconductor chip or integrated with the optoelectronic circuit and the at least one photo detector in the semiconductor chip; and a spacer;

the method comprising:

assembling the semiconductor chip, the spacer and the interferometric component in a stack with the spacer disposed between the semiconductor chip and the interferometric component;

wherein the light source and the at least one photodetector have respective positions on the semiconductor chip such that after the semiconductor chip, the spacer and the interferometric component have been assembled in the stack, the light source is disposed to provide light to the interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the membrane and the optical element, and the at least one photo detector is disposed to detect at least part of an interference pattern generated by said first and second portions of light dependent on said optical path difference;

wherein the stack comprises an internal cavity and at least one aperture providing a passage for air between the internal cavity and an exterior of the stack, such that the internal cavity is in fluid communication with the exterior of the stack; and wherein a first side of the membrane is in fluid communication with the exterior of the stack and a second side of the membrane is in fluid communication with the internal cavity.

The invention extends to an optical microphone module manufactured using the method of the invention as defined above.

When viewed from a second aspect, the invention provides an optical microphone module for installation in a housing to form an optical microphone assembly, the optical microphone module comprising:

an interferometric component comprising a substrate, a membrane and at least one optical element spaced from the membrane, wherein the at least one optical element comprises a surface of the substrate and/or is disposed on a surface of the substrate;

a semiconductor chip comprising an optoelectronic circuit including at least one photo detector;

a light source mounted on the semiconductor chip or integrated with the optoelectronic circuit and the at least one photo detector in the semiconductor chip; and a spacer;

wherein the semiconductor chip, the spacer and the interferometric component are assembled in a stack with the spacer disposed between the semiconductor chip and the interferometric component;

wherein the light source is arranged to provide light to the interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the membrane and the optical element, and wherein the at least one photo detector is arranged to detect at least part of an interference pattern generated by said first and second portions of light dependent on said optical path difference;

wherein the stack comprises an internal cavity and at least one aperture providing a passage for air between the internal cavity and an exterior of the stack, such that the internal cavity is in fluid communication with the exterior of the stack; and wherein a first side of the membrane is in fluid communication with the exterior of the stack and a second side of the membrane is in fluid communication with the internal cavity.

When it is said that the semiconductor chip comprises the optoelectronic circuit, which includes at least one photo detector, this means that the optoelectronic circuit including the at least one photo detector is integrated in the semiconductor chip, e.g. monolithically integrated. The light source may be monolithically integrated with the circuit and the photo detector(s) in the chip. The semiconductor chip may comprise an integrated circuit, e.g. application-specific integrated circuit (ASIC).

When it is said that two regions are in fluid communication, this may be understood to mean that air can flow between the regions so as to allow substantially instantaneous pressure equalisation between the regions, e.g. where two regions are in fluid communication via one or more apertures, being in fluid communication may be understood to mean that air can flow through the apertures without significant acoustic resistance. Accordingly, it is to be understood that the term "fluid communication" does not apply to a small gap such as a vent that only allows for equalization of static pressure between two regions on a long timescale (e.g. to accommodate changes in ambient pressure in locations where the optical microphone assembly is to be used). However, such a vent may additionally be provided (e.g. in the membrane) to allow equalization of static pressure between an acoustic cavity of the optical microphone assembly and the exterior of the optical microphone assembly.

It is to be understood that the "exterior" of the stack refers to regions that are not within the stack, but which may not necessarily be in fluid communication with each other e.g. when the optical microphone module is installed in the housing to form the optical microphone assembly. For example, it is said that the internal cavity is in fluid communication with the exterior of the stack and a first side of the membrane is in fluid communication with the exterior of the stack. This may be also expressed as the internal cavity being in fluid communication with a first region exterior to the stack and the first side of the membrane being in fluid communication with a second region exterior to the stack. When the module is installed in the housing, the first and second regions may correspond respectively to the acoustic cavity and the exterior of the optical microphone assembly.

As will be understood from the disclosure above, when it is said that the semiconductor chip, the spacer and the interferometric component are arranged in a stack, this means that these elements are arranged with the spacer disposed between the other two elements. Being assembled in a stack may be understood to mean that the semiconductor chip, the spacer and the interferometric component are arranged one on top of the other in a layered arrangement (although it is to be understood that no particular orientation of the assembled stack is required). For example, the semiconductor chip, the spacer and the interferometric component may each define a layer in the stack. Each of the semiconductor chip, the spacer and the interferometric component may be contained substantially or entirely within its own layer, e.g. such that the semiconductor chip is substantially or entirely on a first side of the spacer and the interferometric component is substantially or entirely on a second side of the spacer. The semiconductor chip and the interferometric component may be positioned so as to define a volume therebetween, wherein the spacer is partly, substantially, or entirely contained within that volume. It is not essential for the semiconductor chip, the spacer and the interferometric component to have the same (or substantially the same) lateral dimensions or to occupy the same area or 'footprint' in the stack, although they may do so in some embodiments. One or more of the semiconductor chip, the spacer and the interferometric component could have different lateral dimensions from the other(s), e.g. a different length and/or width.

In a set of embodiments, at least one of the interferometric component and the spacer has a shape that defines the internal cavity in the stack. It is to be understood that this means that either the spacer has a shape that defines the internal cavity in the stack, or the interferometric component has a shape that defines the internal cavity in the stack, or the spacer and the interferometric component each have a respective shape where their respective shapes cooperate to define the internal cavity in the stack.

For example, the spacer may comprise a hole or hollow e.g. surrounded by a peripheral wall. For example, the spacer may comprise a hole extending therethrough from a first side to a second side thereof, wherein the semiconductor chip is mounted against the first side of the spacer and the interferometric component is mounted against the second side of the spacer so as to surround the hole. As another example, the interferometric component may comprise a hole or hollow e.g. surrounded by a spacing portion or a peripheral wall. For example, the interferometric component may be shaped such that there is a hole or hollow that is positioned (when the stack is assembled) between the substrate and the spacer. These examples may be provided in combination. For example, the spacer and the interferometric component may each comprise a respective hole or hollow such that when the spacer and the interferometric component are in the stack, their respective holes or hollows are joined together to form a single combined volume which forms the internal cavity.

In a set of embodiments, at least one of the spacer and the interferometric component comprises the at least one aperture. For example, there may be one or more apertures in the spacer and/or one or more apertures in the interferometric component.

It is to be understood that the method of the invention does not necessarily comprise a step of installing the optical microphone module in the housing, although as discussed below, the method may further comprise such an installation step.

Each of the semiconductor chip, spacer, and interferometric components may be a micro-electromechanical systems (MEMS) component or a non-MEMS component.

The meaning of the term micro-electromechanical system (MEMS) is well understood by a person skilled in the art, so it will be understood that when a component is described as being a "MEMS component", this means that the component comprises miniaturized mechanical and/or electro-mechanical elements (i.e. devices and structures), for example, which may have been made using microfabrication techniques, where miniaturized means that the physical dimensions of the miniaturized elements are on the scale of micrometres, e.g. up to a millimetre or shorter. It will thus also be understood that a "non-MEMS" structure is a structure that does not meet the definition of "MEMS" as given above.

The method and optical microphone module of the present invention provide advantages in production (particularly mass production) of optical microphone modules and optical microphone assemblies. Owing to the optical readout method used in optical microphones, it is typically necessary for the light source, interferometric component and photo detector(s) to be precisely aligned when the optical microphone assembly is manufactured. However, it may also be desirable for the optical microphone assembly to comprise a large housing e.g. including a large enclosure for forming a large acoustic cavity. A large acoustic cavity is desirable because it reduces the impact of compression of the air in the acoustic cavity when the membrane vibrates. Compression of the air results in an effect equivalent to a stiffening of the membrane, especially at large deflections, which can negatively impact microphone performance. The step of assembling the semiconductor chip, the spacer and the interferometric component in the stack preferably comprises aligning the light source, the photo detector(s), the optical element and/or the membrane.

Having a large housing in which to install the interferometric component, the light source and photo detector(s) can make it difficult to position these elements precisely relative to each other to achieve the necessary alignment. By providing the light source and photo detector(s) on a semiconductor chip assembled in a stack with a spacer and the interferometric component (and including one or more apertures to provide fluid communication between the membrane and the acoustic cavity via the internal cavity) in accordance with the present invention, it is possible to align them in an initial alignment step during assembly of the stack prior to installing the optical microphone module in a large housing using less precise techniques. For example, the alignment during assembly of the stack may be carried out using techniques (e.g. MEMS-based techniques, wafer-level packaging, fan-out techniques) that are easier and/or more precise than techniques that would be required to mount and align an interferometric component and a separate light source and photodetector in a large housing. In addition, as the installation step can be carried out with less precision, it may be carried out more quickly and easily. The invention may thus advantageously facilitate easier, faster and/or cheaper production, including mass production.

The invention may also advantageously allow an optical microphone module to be supplied to a consumer (e.g. a manufacturer of a host device for the optical microphone) as a single, pre-fabricated integrated component such that the consumer can install the optical microphone module in their own host device using relatively imprecise techniques, because the alignment of the interferometric component, the light source and the photodetector(s) has already been achieved when the stack was manufactured.

The use of a semiconductor chip comprising having a light source, photo detector(s), and optoelectronic integrated circuitry is advantageous as it facilitates the use of a stack structure without having some of the components, e.g. the photo detector(s), mounted separately (e.g. on a separate application-specific integrated circuit (ASIC) chip) which would require separate alignment of those components.

The spacer may advantageously provide or help to provide sufficient distance between the semiconductor chip and the interferometric component such that air passages, i.e. one or more apertures, can be provided (e.g. in the spacer and/or the interferometric component) that are large enough to allow fluid communication between the second side of the membrane and an acoustic cavity when the optical microphone module is installed in a housing. The invention may thus advantageously allow a single, integrated optical microphone module to be provided wherein the light source, interferometric component and photo detector(s) thereof are precisely aligned due to the stack configuration, and wherein the component is also suitable for use in an optical microphone assembly having a large acoustic cavity that does not form part of the stack.

It will thus be appreciated from the present disclosure that a "module" may be understood to mean a single unit comprising integrated components, e.g. comprising pre-aligned components. A "module" may be understood to mean a pre-fabricated unit, e.g. ready for installation. An "optical microphone module" may be described as self-contained, which may mean, for example, not requiring any external light sources, detectors, or optical components to function.

In a set of embodiments, the first side of the membrane is open to the exterior of the stack and the substrate of the interferometric component comprises one or more substrate apertures via which the second side of the membrane is in fluid communication with the internal cavity. In such embodiments, the interferometric component may be arranged such that the substrate thereof is positioned between the membrane and the internal cavity.

In another set of embodiments, the substrate of the interferometric component comprises substrate apertures via which the first side of the membrane is in fluid communication with the exterior of the stack, and the second side of the membrane is open to the internal cavity. When it is said that a side of the membrane is open to a region, this may be understood to mean that there are no intervening apertures between the membrane and the region e.g. any apertures that are smaller than the membrane. The term "substrate aperture" means an aperture in the substrate and is used to distinguish the substrate aperture(s) from the aperture(s) mentioned above that provide fluid communication between the internal cavity and the stack exterior.

The substrate may have any suitable thickness. In some embodiments, the substrate has a uniform thickness. In some embodiments, the substrate does not have a uniform thickness, e.g. the substrate may comprise a thin (e.g, etched) region surrounded by a thicker, supporting region.

The spacer may be affixed to the semiconductor chip, e.g. using bonding, adhesive or any suitable affixing means. The method may comprise affixing the spacer to the semiconductor chip.

The spacer may be integrally formed with the interferometric component e.g. such that the spacer and the substrate of the interferometric component are formed from a single piece.

Alternatively, the spacer and the interferometric component may be formed from separate pieces. The spacer may be affixed to the interferometric component using any suitable affixing means. The method may comprise affixing the spacer to the interferometric component. The spacer may be formed from a single piece or from two or more pieces. For example, the spacer may comprise two or more pieces arranged in a layered or stacked arrangement. The method may comprise assembling the spacer from two or more pieces, e.g. in a layered or stacked arrangement. The step of assembling the semiconductor chip, the spacer and the interferometric component in a stack may comprise assembling the spacer from two or more pieces, e.g. in a layered or stacked arrangement.

Where components of the optical microphone module (e.g. the spacer, the interferometric component, the semiconductor chip, the light source) are described as being mounted on or affixed to another component or each other, this may be achieved by any suitable means or methods. Some non-limiting examples include wafer-level assembly techniques, such as wafer bonding or fan-out methods; chip-level assembly such as flip-chip bonding or pick-and-place of the components; and surface-mounting/soldering.

The method may comprise installing the optical microphone module in the housing to form the optical microphone assembly.

The housing may comprise a housing base suitable for mounting the optical microphone module thereon. The method may comprise mounting the optical microphone module on the housing base. The housing base may comprise an application-specific integrated circuit (ASIC) chip.

The housing may comprise an enclosure for mounting over the stack to form an acoustic cavity. The method may comprise mounting the enclosure over the stack to form an acoustic cavity.

The enclosure may be configured, e.g. shaped, such that it is suitable for affixing to the housing base or to the semiconductor chip such that the enclosure is covering the stack. The semiconductor chip may comprise a mounting region surrounding the stack on the semiconductor chip, wherein the mounting region is suitable for having an enclosure mounted thereon e.g. by sealing the enclosure to the semiconductor chip. For example, the mounting region may comprise a flat surface surrounding the stack, e.g. a surface that is free from components and integrated circuitry. The method may comprise affixing the enclosure to the housing base or to the semiconductor chip such that the enclosure is covering the stack.

The enclosure may comprise an acoustic port, e.g. an aperture substantially the same size as the membrane of the optical microphone module to be installed in the housing. The acoustic port may be sized, shaped and/or positioned such that when the enclosure is mounted over the stack, the enclosure can be sealed to the stack with the acoustic port aligned with the membrane, e.g. by sealing the interferometric component or another part of the stack to a periphery of the acoustic port. The method may comprise sealing the enclosure to the stack with an acoustic port in the enclosure aligned with the membrane, e.g. by sealing the interferometric component or another part of the stack to a periphery of the acoustic port.

The enclosure may define an acoustic cavity such that when the optical microphone module is installed in the housing to form an optical microphone assembly, the first side of the membrane is in fluid communication with the exterior of the optical microphone assembly (e.g. via the acoustic port) and the second side of the membrane is in fluid communication with the acoustic cavity via the internal cavity of the stack.

The stack, e.g. the interferometric component, may comprise an attachment region surrounding the membrane, wherein the attachment region is suitable for sealing to an enclosure. For example, the attachment region may be a flat surface portion surrounding the membrane. The attachment region may be a protruding portion, for example, a wall surrounding the membrane. This can be advantageous because when an enclosure is sealed to the protruding attachment region, membrane is set back from the surface of the housing and thus less exposed, reducing the risk of damage to the membrane during use of the optical microphone assembly. The method may comprise sealing the enclosure to an attachment region of the stack (e.g. of the interferometric component) wherein the attachment region surrounds the membrane.

The optical microphone module (e.g. the semiconductor chip) may comprise an exposed surface (e.g. a side of the semiconductor chip facing away from the spacer and the interferometric component) suitable for mounting the optical microphone module in the housing, e.g. for affixing the optical microphone module to a housing base. The method may comprise mounting the optical microphone module in the housing by affixing the exposed surface to the housing, e.g. to the housing base.

Arrangements in which the semiconductor chip is mounted on the housing base with an acoustic port in the enclosure may be described as "top port" configurations. It is not essential for the optical microphone module to be mounted in such a 'top port' configuration. The optical microphone module may be mounted in a 'bottom port' configuration. In a 'bottom port configuration', the acoustic port may be provided in the housing base. The optical microphone module may be mounted in an inverted orientation, e.g. with the interferometric component attached to the housing base and the membrane aligned with acoustic port so that the membrane is open to the exterior of the housing via the acoustic port in the housing base.

When an element of the optical microphone assembly is described as being mounted on another element, this may comprise sealing, gluing, bonding or otherwise affixing one element to the other.

The optical microphone assembly may be installed in, may be suitable for installation in or may form part of a host device (e.g. a smartphone). The optical microphone assembly may be formed separately from the host device, i.e, wherein the optical microphone module can be mounted in the housing to form the optical microphone assembly, and then the optical microphone assembly can be mounted in the host device. Alternatively, the optical microphone assembly may be formed in, e.g. may comprise (or comprise parts of) the host device. For example, installing the optical microphone module in the housing to form the optical microphone assembly may comprise mounting the optical microphone module (e.g. by attaching the semiconductor chip) directly on a surface of the host device and mounting an enclosure over the stack.

The invention extends to an optical microphone assembly or host device comprising an optical microphone module as defined above installed therein or thereon.

The semiconductor chip may have a size of around 2 mm$^2$, although larger and smaller sizes are possible, e.g. the semiconductor chip may have a size in the range 0.01 mm$^2$ (i.e. 100×100 μm$^2$) to 8 mm$^2$, e.g. 0.1 mm$^2$ to 4 mm$^2$, e.g. 1 mm$^2$ to 2 mm$^2$. It is to be understood that the size of the semiconductor chip refers to the area of the semiconductor chip surface comprising the optoelectronic circuit incorporating the photo detector(s) and having the light source mounted thereon or integrated therein.

The semiconductor chip may comprise a semiconductor wafer, e.g. a silicon wafer or a GaAs or InGaAs wafer. For example, silicon may be used if the semiconductor chip comprises an ASIC, and GaAs or InGaAs may be used if the light source is integrated in the semiconductor chip.

As noted above, the semiconductor chip may comprise an ASIC (e.g. which may incorporate the optoelectronic circuit). However, this is not essential and in some embodiments a separate ASIC chip comprising an ASIC is provided. In some embodiments where the ASIC chip is separate from the semiconductor chip, the ASIC chip may be mounted separately in the optical microphone assembly (e.g. adjacent to the semiconductor chip) or the semiconductor chip may be mounted on the ASIC chip so that the optical microphone module further comprises the ASIC chip. The optoelectronic circuit may be configured to allow raw or processed signals to be transmitted to the ASIC or off the chip, e.g. to the separate ASIC chip, where provided. The ASIC may be configured to control the light source and/or photodetector(s). The ASIC may be configured to process signals received from the photodetector(s), e.g. the ASIC may comprise a micro-processor, a Digital Signal Processor or a Field-Programmable Gated Array. The ASIC may be configured to perform all processing required for the functioning of the optical microphone without requiring a separate processor, e.g. the ASIC may comprise an output pin for outputting a signal, wherein the ASIC is configured to process signals received from the photo detector(s) to yield an output signal representing the amplitude of an incoming acoustic wave and to output the output signal to the output pin.

As noted above, the spacer provides separation between the semiconductor chip and the interferometric component. In particular, the spacer may provide separation between the light source and photo detector(s) on the semiconductor chip and the optical element and membrane of the interferometric component. The interferometric component may also provide separation between the light source/photo detector(s) and the membrane/optical component. The interferometric component may comprise a spacing portion, e.g. where the spacing portion provides a separation between the membrane or optical component of the interferometric component and the spacer.

The interferometric component may comprise a spacing portion which is shaped to define the internal cavity (e.g. by itself or in combination with the spacer). The spacing portion may be shaped to surround or partly surround a space between the membrane or optical component and the spacer, thereby defining the internal cavity or part of the internal cavity, e.g. the spacing portion may be a peripheral wall. The aperture(s) may be provided in the spacing portion, e.g. only in the spacing portion or in the spacing portion and in the spacer.

The spacer, the spacing portion, or both the spacer and the spacing portion together may therefore provide adequate space for one or more apertures in one or both of the spacer and the interferometric component (e.g. in the spacing portion) to provide fluid communication between the internal cavity and an acoustic cavity.

The spacer (or the spacer together with the spacing portion) may have a height that provides a separation between the optical element and the semiconductor chip that is greater than 200 μm, e.g. greater than 300 μm, e.g. greater than 400 μm, e.g. greater than 500 μm, e.g. greater than 600 μm, e.g. greater than 700 μm, e.g. greater than 800 μm, e.g. greater than 900 μm, e.g. greater than 1 mm. The separation between the optical element and the semiconductor chip may be more precisely defined as the perpendicular separation between the optical element and a surface on the semiconductor chip which comprises the photo detector(s).

The height of the spacer or of the spacer together with the spacing portion may be selected based on a required light propagation distance between the interferometric component and the light source and photo detector(s) on the semiconductor chip. For example, the first and second light portions may propagate at an angle to the surface of the membrane such that the second light portion impinges on the photo detectors that are laterally displaced from the light source on the semiconductor chip. The angle of propagation of the light portions may be determined by the nature of the interferometric component, e.g. the type of optical element, or e.g. by an angle of a detected diffraction order.

The height of the spacer or of the spacer together with the spacing portion may therefore be selected to ensure that the separation between the detectors and the interferometric components is sufficient for the second light portion to arrive at the photo detector(s) for the particular angle of propagation and separation between the light source and photo detector(s). Providing the photo detector(s) and light source on the same semiconductor chip in accordance with the invention may advantageously allow a smaller separation between the semiconductor chip and the interferometric component, because the light source and photo detector(s) may be positioned closer together than might be possible if, for example, they were provided separately instead of being integrated on the same chip as the light source.

The provision of a spacer may advantageously allow for one or more optical components, e.g. a microlens, to be provided between the semiconductor chip and interferometric component. In a set of embodiments, one or more optical components (e.g. a lens or microlens) are provided in or on the spacer.

Providing one or more optical components in or on the spacer advantageously allows the alignment of the optical component(s) during assembly of the optical microphone module stack. As noted above, techniques used for assembly and alignment of the stack may be more precise and/or easier than techniques for assembling larger parts of the optical microphone assembly (e.g. the base and enclosure). Accordingly, precise alignment of the optical component(s) may be more easily achieved in accordance with embodiments of the invention.

This is novel and inventive in its own right and thus when viewed from a third aspect, the invention provides an optical microphone module for installation in a housing to form an optical microphone assembly, the optical microphone module comprising:

an interferometric component comprising a substrate, a membrane and at least one optical element spaced from the membrane, wherein the at least one optical element comprises a surface of the substrate and/or is disposed on a surface of the substrate;

a semiconductor chip comprising at least one photo detector and a light source, wherein the at least one photo detector and the light source are mounted on or integrated in the semiconductor chip;

a spacer; and one or more optical components provided in or on the spacer;

wherein the semiconductor chip, the spacer and the interferometric component are assembled in a stack with the spacer disposed between the semiconductor chip and the interferometric component;

wherein the light source is arranged to provide light to the interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the membrane and the optical element, and wherein the at least one photo detector is arranged to detect at least part of an interference pattern generated by said first and second portions of light dependent on said optical path difference;

wherein the stack comprises an internal cavity and at least one aperture providing a passage for air between the internal cavity and an exterior of the stack, such that the internal cavity is in fluid communication with the exterior of the stack; and wherein a first side of the membrane is in fluid communication with the exterior of the stack and a second side of the membrane is in fluid communication with the internal cavity.

When viewed from a fourth aspect, the invention provides a method of manufacturing an optical microphone module for installation in a housing to form an optical microphone assembly, wherein the optical microphone module comprises:

an interferometric component comprising a substrate, a membrane and at least one optical element spaced from the membrane, wherein the at least one optical element comprises a surface of the substrate and/or is disposed on a surface of the substrate;

a semiconductor chip comprising at least one photo detector and a light source, wherein the at least one photo detector and the light source are mounted on or integrated in the semiconductor chip;

a spacer; and one or more optical components provided in or on the spacer;

the method comprising:

assembling the semiconductor chip, the spacer and the interferometric component in a stack with the spacer disposed between the semiconductor chip and the interferometric component;

wherein the light source and the at least one photodetector have respective positions on the semiconductor chip such that after the semiconductor chip, the spacer and the interferometric component have been assembled in the stack, the light source is disposed to provide light to the interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the membrane and the optical element, and the at least one photo detector is disposed to detect at least part of an interference pattern generated by said first and second portions of light dependent on said optical path difference;

wherein the stack comprises an internal cavity and at least one aperture providing a passage for air between the internal cavity and an exterior of the stack, such that the internal cavity is in fluid communication with the exterior of the stack; and wherein a first side of the membrane is in fluid communication with the exterior of the stack and a second side of the membrane is in fluid communication with the internal cavity.

The invention extends to an optical microphone module manufactured using the method of the fourth aspect of the invention as defined above.

The semiconductor chip may comprise an optoelectronic circuit integrated therein. The optoelectronic circuit may comprise the photo detector(s). When it is said that the at least one photo detector and the light source are mounted on or integrated in the semiconductor chip, it is to be understood that this includes combinations of mounting and integration, e.g. the light source being mounted on the semiconductor chip and the photo detector(s) being integrated, and vice versa.

In a set of embodiments, at least one of the spacer and the interferometric component has a shape that defines the internal cavity in the stack. In a set of embodiments, at least one of the spacer and the interferometric component comprises the one or more aperture(s).

Optional features of first and second aspects of the invention where applicable may also be optional features of the third and fourth aspects of the invention.

The optical component(s) may be integrated or formed in the spacer, or mounted or fabricated on the spacer. The optical component(s) may be positioned between the semiconductor chip and the membrane, e.g. such that the first and/or second portion of light passes partly or completely through the optical component(s). The optical component(s) may thus allow the first and/or second portion of light to be directed (e.g. focused) to facilitate the operation of the optical microphone module.

The optical component(s) may comprise one or more refractive and/or diffractive optical component(s). One or more of the optical component(s) may collimate the first and/or second portions of light, e.g. as the light propagates from the light source to the membrane. One or more of the optical component(s) may spilt light emitted by the light source into two or more portions, e.g. to split the light into the first and second portions or to split the first and/or second portions into further portions. One or more of the optical component(s) may direct, deflect or focus the first and/or second light portions as they propagate back from the interferometric component so that they impinge on the photo-detector(s).

The step of assembling the semiconductor chip, the spacer and the interferometric component in the stack may comprise aligning the optical component(s) with respect to the light source, the photo detector(s), the optical element and/or the membrane.

The spacer may comprise a supporting structure (e.g. a bridge structure) suspended in the region between the semiconductor chip and the interferometric component. The optical component(s) may be provided in or on the supporting structure, e.g. integrated or formed in the supporting structure, or mounted or fabricated on the supporting structure.

As discussed above, the spacer may have a shape that defines the internal cavity in the stack. Where the spacer comprises a supporting structure, the supporting structure may form a barrier inside the spacer such that the supporting structure defines a boundary of the internal cavity. Alternatively, the supporting structure may comprise one or more holes allowing the passage of air so that the supporting structure does not create a barrier inside the spacer, in which case the supporting structure may be described as being inside the internal cavity of the stack.

The separation between the light source and photo detector(s) may be selected to be large enough that thermal effects (i.e. heat from the light source) do not significantly affect the performance of the photo detector(s). A light source with low power dissipation (e.g. less than 10 mW) may be used to reduce thermal effects. The separation may be selected to be small enough that the spacer (or the spacer together with the spacing portion) can be provided with a convenient compact size (although allowing for the spacing required for fluid communication via the apertures, as discussed above). The separation between the light source and the photo detector(s) may be between 100 μm and 500 μm, e.g. between 200 μm and 300 μm. If there is more than one photo detector, the distance between the light source and photo detector(s) may refer to the average distance between the light source and the photo detectors, or the largest distance between the light source and any one of the photo detectors.

The height of the spacer or of the spacer together with the spacing portion may be less than 3 mm, e.g. less than 2.5 mm, e.g. less than 2 mm, e.g. less than 1.5 mm, e.g. less than 1 mm, e.g. less than 500 μm.

As noted above, the optical element may be a diffractive optical element. It is to be understood that in embodiments where a surface of the membrane is in fluid communication with the exterior of the stack or the internal cavity via substrate apertures in the substrate of the interferometric component, these substrate apertures are distinct from, for example, holes forming part of a diffraction grating (e.g. elongate holes forming grating lines). Such grating line holes are typically small and thin and would not provide an adequately large air passage for fluid communication within the meaning discussed above.

The optical element may be a reflective surface, for example, such that the reflective surface and the membrane operate together as a Fabry-Pérot interferometer. In some embodiments, the optical element may be a reflective surface, and a diffractive optical element may be fabricated on the membrane. For example, this could be used in embodiments as described above wherein the membrane of the interferometric component is positioned between the internal cavity of the stack and the substrate of the interferometric component.

BRIEF DESCRIPTION OF THE DRAWINGS

Certain preferred embodiments will now be described by way of example only with reference to the accompanying drawings in which.

DETAILED DESCRIPTION OF THE INVENTION

Figure 1:
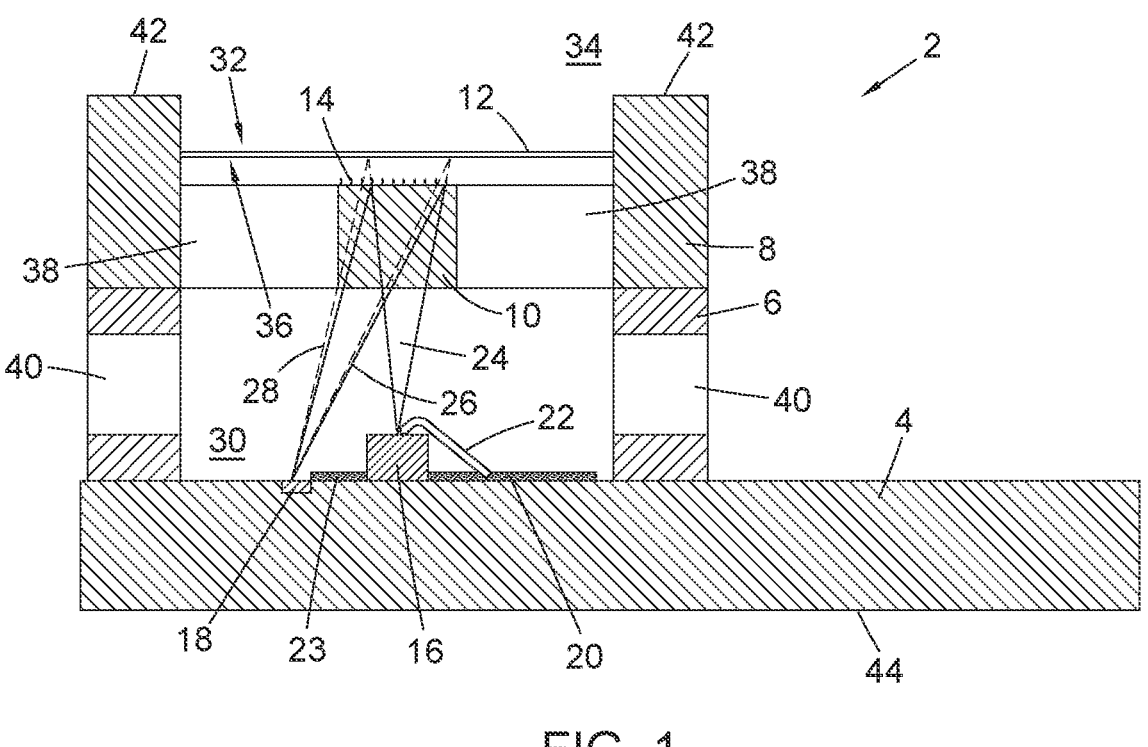
FIG. 1 shows a cross-section of an optical microphone module in accordance with a first embodiment of the present invention.

FIG. 1 shows a first embodiment an optical microphone module 2 in accordance with the present invention. The optical microphone module 2 comprises a semiconductor chip 4, a spacer 6, and an interferometric component 8 arranged in a stack with the spacer 6 between the semiconductor chip 4 and the interferometric component 8. The interferometric component 8 comprises a substrate 10 and a membrane 12. A diffractive optical element 14 is provided on a surface of the substrate 10 facing the membrane 12.

A vertical-cavity surface-emitting laser (VCSEL) 16 is mounted on the semiconductor chip 4. The semiconductor chip also comprises a photodetector 18 and an application-specific integrated circuit (ASIC) 20 adjacent the VCSEL 16. The ASIC 20 is connected to the VCSEL 16 by wire bonding 22 and includes optoelectronic circuitry 23 which incorporates the photodetector 18. The operation of the VCSEL 16 and photodetector 18 is thereby controlled via the ASIC 20.

During operation in an optical microphone assembly, the VCSEL 16 emits light 24 towards the interferometric component 8. The light passes through the substrate 10 and impinges on the diffractive optical element 14. A first portion of light 26 is reflected back from the diffractive optical element 14 and propagates back through the substrate 10 to impinge on the photodetector 18. A second portion of light 28 passes through and is diffracted by the diffractive optical element, and is then reflected from the membrane 12. The reflected light propagates back through the substrate 10 and impinges on the detector 18, which is positioned to receive one of the diffraction orders from the diffractive optical element. The first and second portions of light interfere to create an interference pattern at the detector 18, where the measured intensity at the photodetector 18 depends on the separation between the diffractive optical element 14 and the membrane 12. Accordingly, when the membrane vibrates in the presence of an acoustic wave, the displacement of the membrane, which corresponds to the amplitude of the incoming wave, can be related to the intensity of the light detected at the photodetector 18. The displacement of the membrane, and thus the time-varying amplitude of the incoming acoustic wave, can be determined from the signal recorded at the photodetector 18.

The spacer 6 is shaped so as to define an internal cavity 30 between the semiconductor chip 4 and the interferometric component 8. A first side 32 of the membrane 12 is open to the exterior 34 of the optical microphone module 2. A second side of the membrane 36 is in fluid communication with the internal cavity 30 via large apertures 38 in the substrate 10. The internal cavity 30 is in fluid communication with the exterior 34 of the optical microphone module 2 via large apertures 40 in the spacer 6. The interferometric component 8 is provided with an upper attachment region 42 which surrounds the membrane. The attachment region 42 is suitable for sealing to the periphery of an acoustic port in an enclosure that can be placed over the optical microphone module 2 so as to create an acoustic cavity, as discussed further below with reference to FIGS. 2 to 5.

The optical microphone module 2 is manufactured by assembling the semiconductor chip 4 the spacer 6 and the interferometric component 8 in a stack, using precise alignment techniques to correctly align the VCSEL 16, the interferometric component 8, and the photo detector 18. In this example, the components are assembled using wafer bonding, but other techniques (e.g. other wafer-level assembly techniques, such as fan-out techniques; flip-chip/bump bonding; adhesive with pick-and-place of components; surface mounting; soldering) could be used instead in this embodiment and in other embodiments. The stack is assembled prior to installation of the optical microphone module 2 in an optical microphone assembly or host device. The semiconductor chip 4 is provided with an exposed surface 44 on the bottom of the semiconductor chip 4, where the exposed surface 44 is suitable for mounting the optical microphone module 2 on a surface in an optical microphone assembly or host device.

Figure 2:
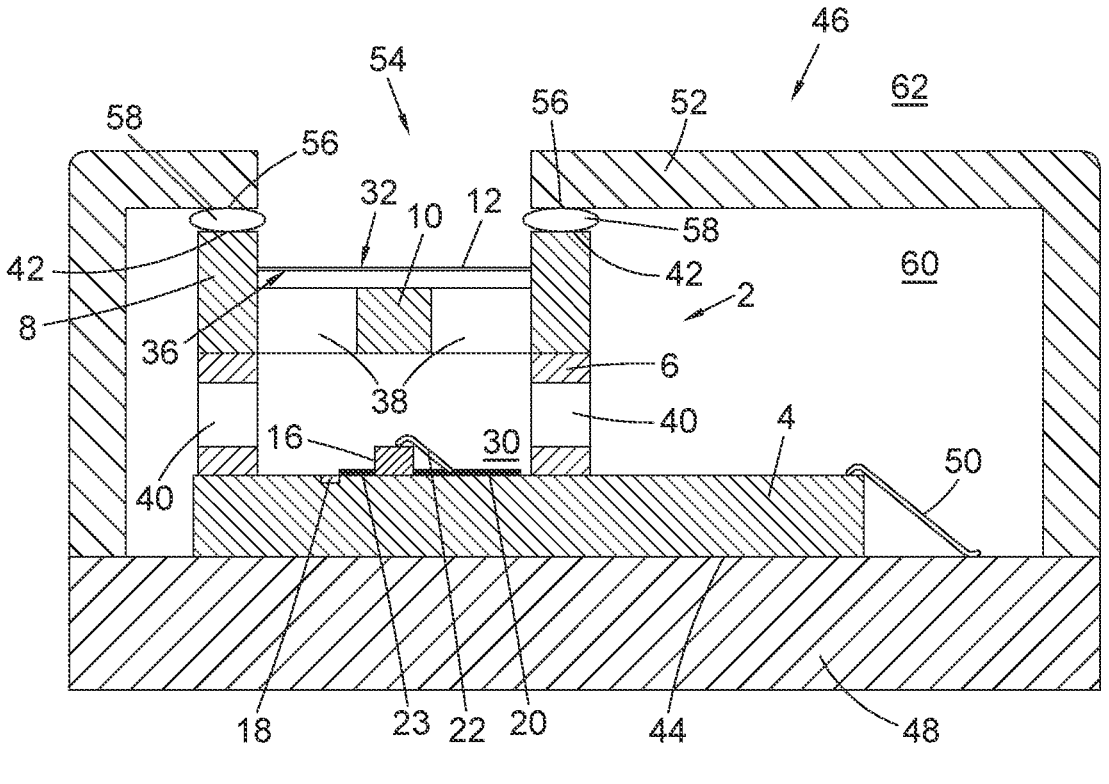
FIG. 2 shows a cross-section of an optical microphone assembly incorporating the optical microphone module of FIG. 1.
Figure 3:
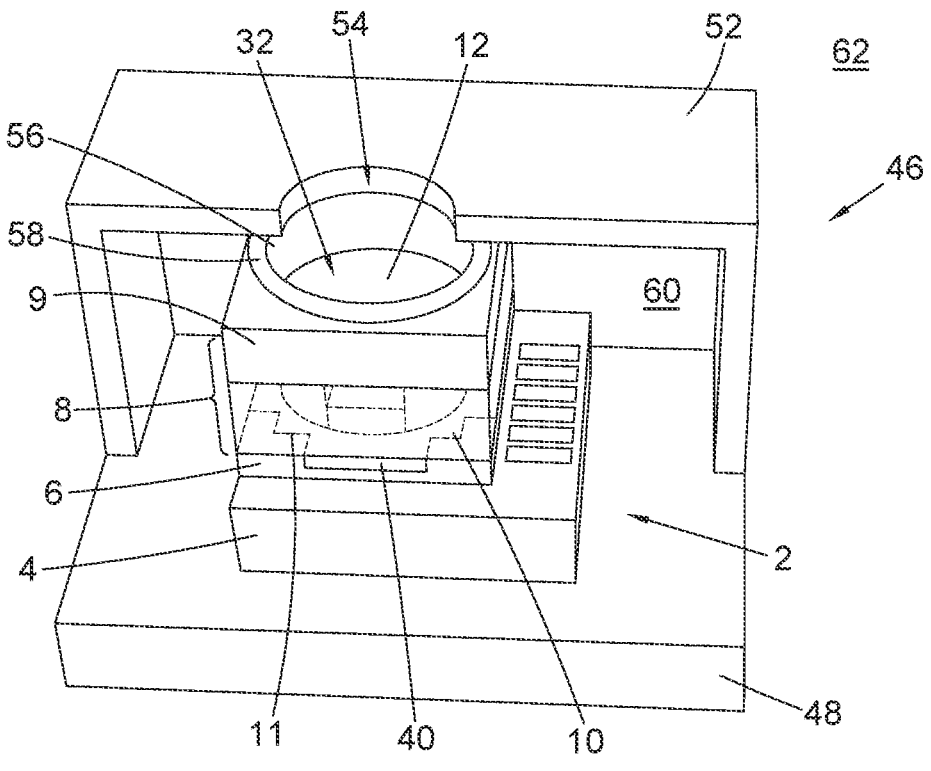
FIG. 3 shows a partly cut away three-dimensional representation of the embodiment of FIG. 2.

FIGS. 2 and 3 show the optical microphone module 2 of FIG. 1 installed in an optical microphone assembly 46. The optical microphone assembly 46 comprises a base 48 on which the optical microphone module 2 is mounted via the surface 44 of the semiconductor chip 4. The semiconductor chip 4 is connected to the base 48 via wire bonding 50 to allow the output of the ASIC 20 to be transmitted off the semiconductor chip 4. Wire bonding is not essential, and alternative methods could be used instead. An enclosure 52 is mounted over the optical microphone module 2. The enclosure 52 is mounted on the base 48. The enclosure comprises an acoustic port 54. A peripheral region 56 of the enclosure 52 surrounding the acoustic port 54 is sealed using stress free glue 58 to the attachment region 42 of the interferometric component 8. The enclosure 52 thereby forms an enclosed acoustic cavity 60 that is not in fluid communication with the exterior 62 of the optical microphone assembly 46. With the optical microphone module 2 installed in the optical microphone assembly 46 in this way, the first side 32 of the membrane 12 is in fluid communication with the exterior 62 of the optical microphone assembly 46 via the acoustic port 54, and the second side 36 of the membrane 12 is in fluid communication with the acoustic cavity 60 via the apertures 38 in the interferometric component substrate 10, the internal cavity 30 of the stack, and the apertures 40 in the spacer 6.

When an incoming acoustic wave impinges on the optical microphone assembly, it exerts a pressure on the first side 32 of the membrane 12. As the acoustic cavity 60 is isolated from the exterior 62 of the optical microphone assembly, the acoustic wave does not exert a pressure on the second side 36 of the membrane 12. This creates a pressure differential that causes the membrane 12 to be displaced by an amount proportional to the time-varying amplitude of the incoming acoustic wave. This displacement is then measured using the interferometric readout method described above. The signal at the detector can thus be used to determine the amplitude of the incoming acoustic wave.

As discussed above, the semiconductor chip, spacer and interferometric component 8 are aligned during assembly of the stack using precise alignment techniques. This means that when the optical microphone module 2 is installed in the optical microphone assembly 46, this can be achieved using relatively imprecise positioning techniques, as the alignment of the VCSEL 16, the interferometric component 8 and the photo detector 18 has already been established via the precise alignment techniques when the stack was assembled.

It can be seen from FIG. 3 that the interferometric component comprises two portions affixed together. The first portion 11 comprises the substrate 10 of the interferometric component, having the optical element 14 thereon and the apertures 38 formed therein. The second portion is a membrane support 9, which is mounted on top of the substrate.

Figure 4:
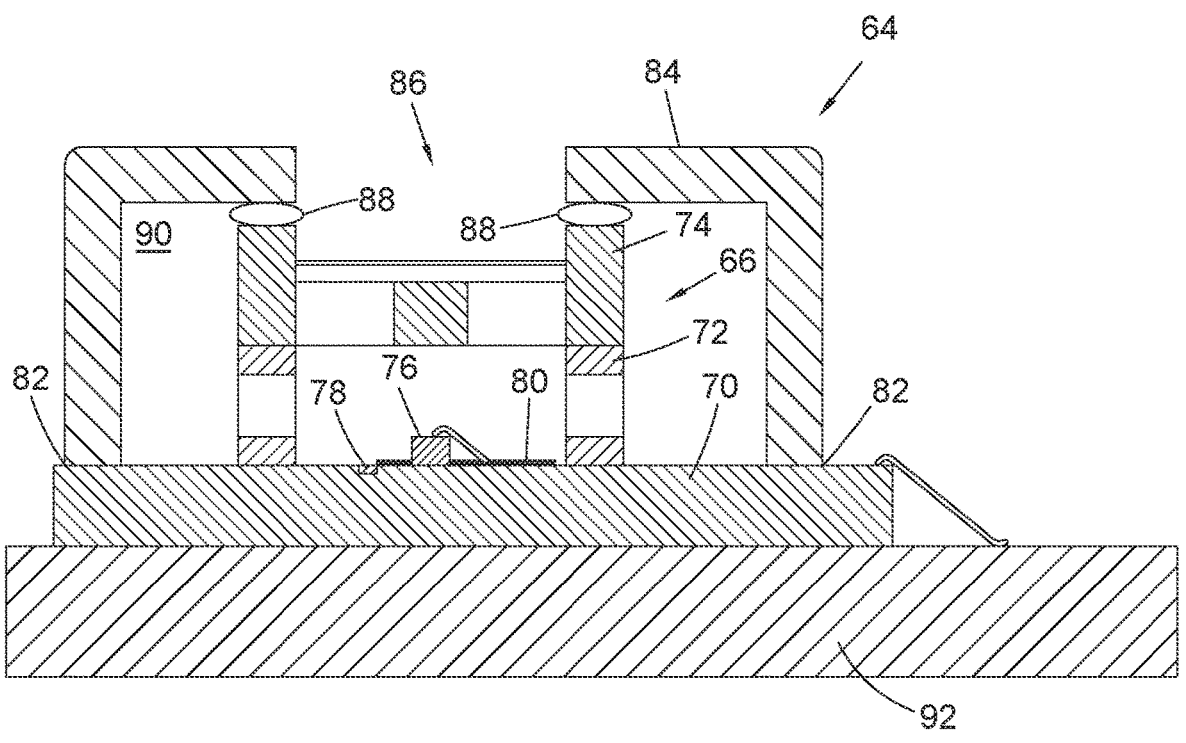
FIG. 4 shows an optical microphone assembly incorporating an optical microphone module in accordance with a second embodiment of the present invention.

FIG. 4 shows an optical microphone assembly 64 in accordance with a second embodiment of the present invention having installed therein an optical microphone module 66. The optical microphone module 66 of this embodiment is identical to the optical microphone module 2 of the first embodiment (including a semiconductor chip 70, a spacer 72 and an interferometric component 74) except that the spacer 72 and the interferometric component 74 are positioned more centrally on the semiconductor chip 70. The semiconductor chip 70 comprises a VCSEL 76, a photo detector 78 and an application-specific integrated circuit 80, which are also positioned more centrally than the corresponding components in the embodiment of FIGS. 1 to 3. As a consequence, the semiconductor chip 70 has a peripheral surface 82 surrounding the spacer 72 and the interferometric component 74, where the peripheral surface 82 is suitable for mounting an enclosure. As can be seen in FIG. 4, an enclosure 84 is mounted on the semiconductor chip at the peripheral region 82, and comprises an acoustic port 86. The enclosure 84 is sealed to the interferometric component 74 using stress free glue 88 at a periphery of the acoustic port 86 in a similar manner to that described in relation to the embodiment shown in FIG. 2. The enclosure 84 thus forms an acoustic cavity 90, and the optical microphone thus operates in the same manner described above with reference to FIGS. 1 and 2.

The optical microphone module 66 with the enclosure 84 mounted thereon is mounted on a base 92 of the optical microphone assembly 64. Having an acoustic cavity that is mounted on the semiconductor chip can be advantageous, for example, it may allow optical microphone assemblies including an enclosure to be manufactured, e.g. mass produced, by first assembling the optical microphone module stack, and then in a separate step mounting the enclosure 84. The optical microphone assembly provided in this way could then be supplied to, for example, a third party manufacturer such that it can be immediately installed in a host device, i.e. such that the base 92 is a surface of the host device.

Figure 5:
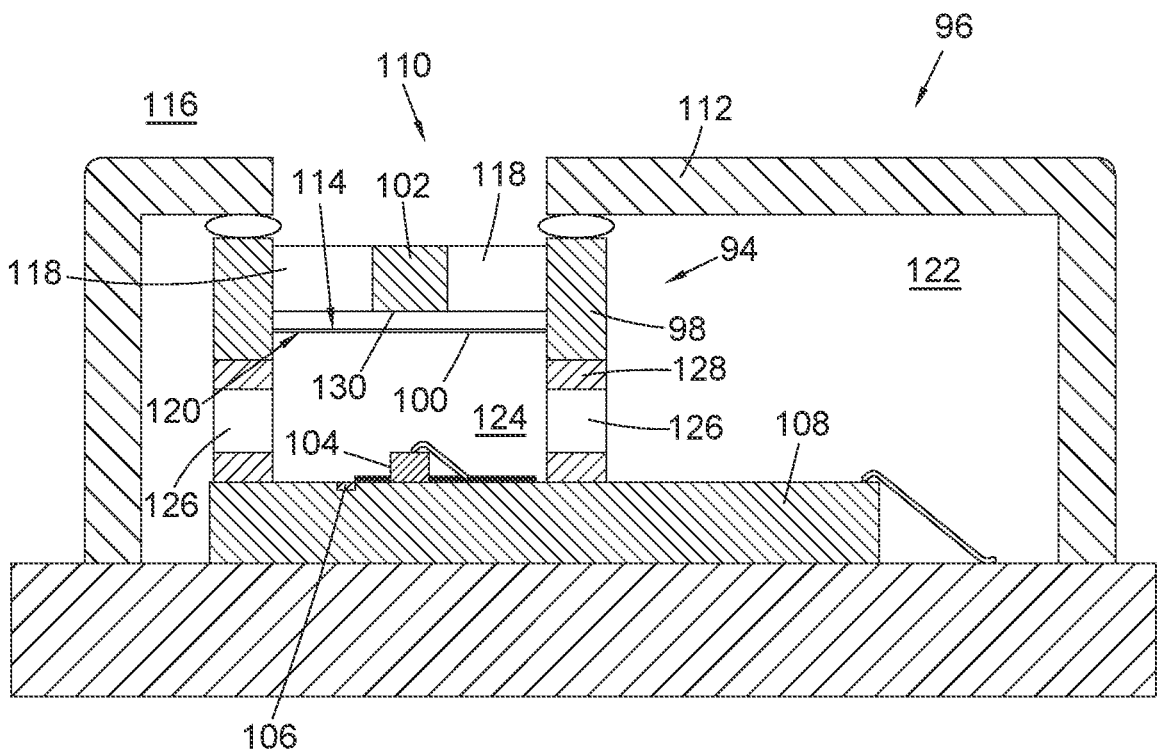
FIG. 5 shows an optical microphone assembly incorporating an optical microphone module in accordance with a third embodiment of the present invention.

FIG. 5 shows a third embodiment of an optical module component 94 installed in an optical microphone assembly 96. The optical microphone module 94 is identical to the optical microphone module 2 of the first embodiment, except that the optical microphone module 94 comprises an interferometric component 98 that is inverted compared with the interferometric component 8 of the first embodiment, i.e. the interferometric component comprises a partially transparent membrane 100 and a substrate 102 where the membrane faces towards a VCSEL 104 and a photo detector 106 on a semiconductor chip 108 while the substrate 102 is adjacent an acoustic port 110 in an enclosure 112 of the optical microphone assembly 96.

Thus in this embodiment, a first side 114 of the membrane is in fluid communication with an exterior 116 of the optical microphone assembly 96 via the acoustic port 110 and apertures 118 in the substrate 102. A second side 120 of the membrane 100 is in fluid communication with an acoustic cavity 122 formed by the enclosure 112 via an internal cavity 124 of the optical microphone module 94, and apertures 126 in a spacer 128 of the optical microphone module. In this example, the membrane 100 and a surface 130 of the substrate 102 together function as a Fabry-Pérot interferometer to generate an interference pattern at the detector 106. However, alternative interferometric arrangements are possible, e.g. a diffractive optical element could be formed on the membrane 100.

Figure 6:
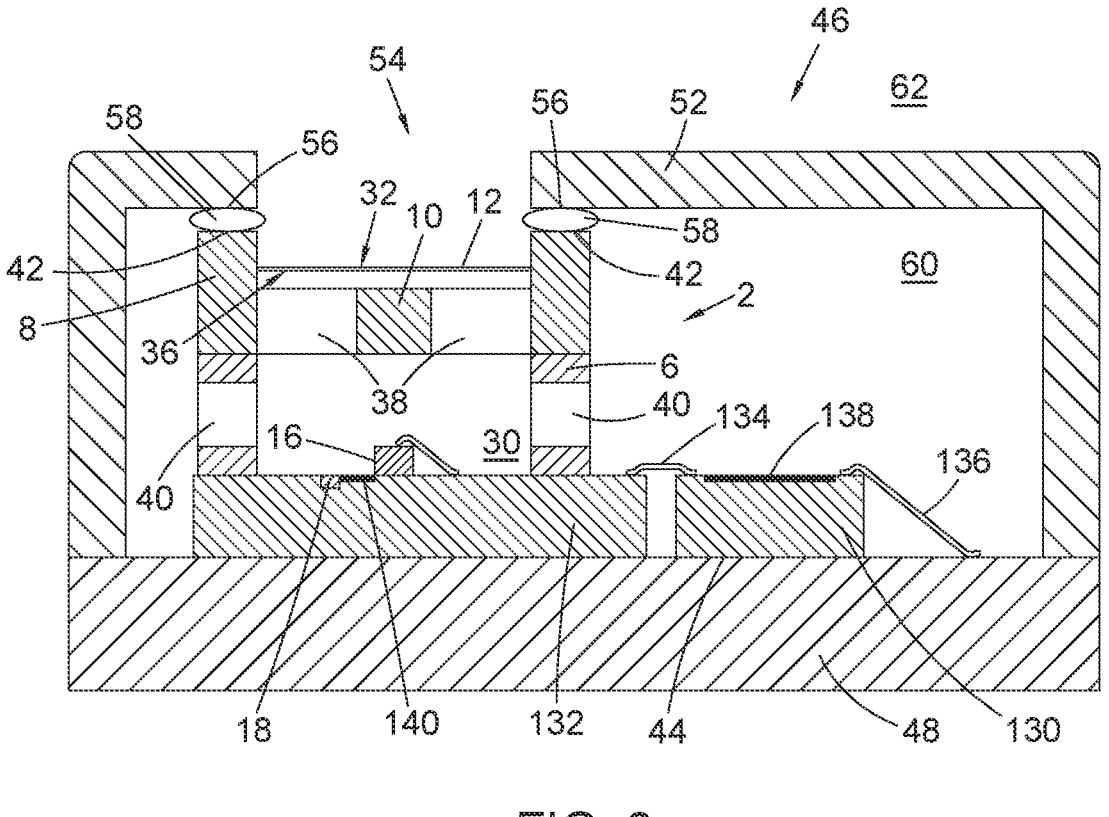
FIG. 6 shows an optical microphone assembly incorporating an optical microphone module in accordance with a fourth embodiment of the present invention.

FIG. 6 shows a variation on the embodiment of FIG. 2, where corresponding features are denoted with like numerals. In this embodiment, an ASIC chip 130 is provided in addition to a semiconductor chip 132. Connections 134, 136 are provided between the semiconductor chip 132 and the ASIC chip 130 to allow control of the photo detector 18 and light source 16 by the ASIC chip 130, and between the ASIC chip 130 and the base 48 to allow connection to off-chip components, e.g. a power source. An ASIC 138 is provided on the ASIC chip (instead of on the semiconductor chip), and an optoelectronic circuit 140 comprising the photo detector 18 is provided on the semiconductor chip 132. A separate ASIC chip could similarly be provided in variations on other embodiments, e.g. the other embodiments described above.

Figure 7:
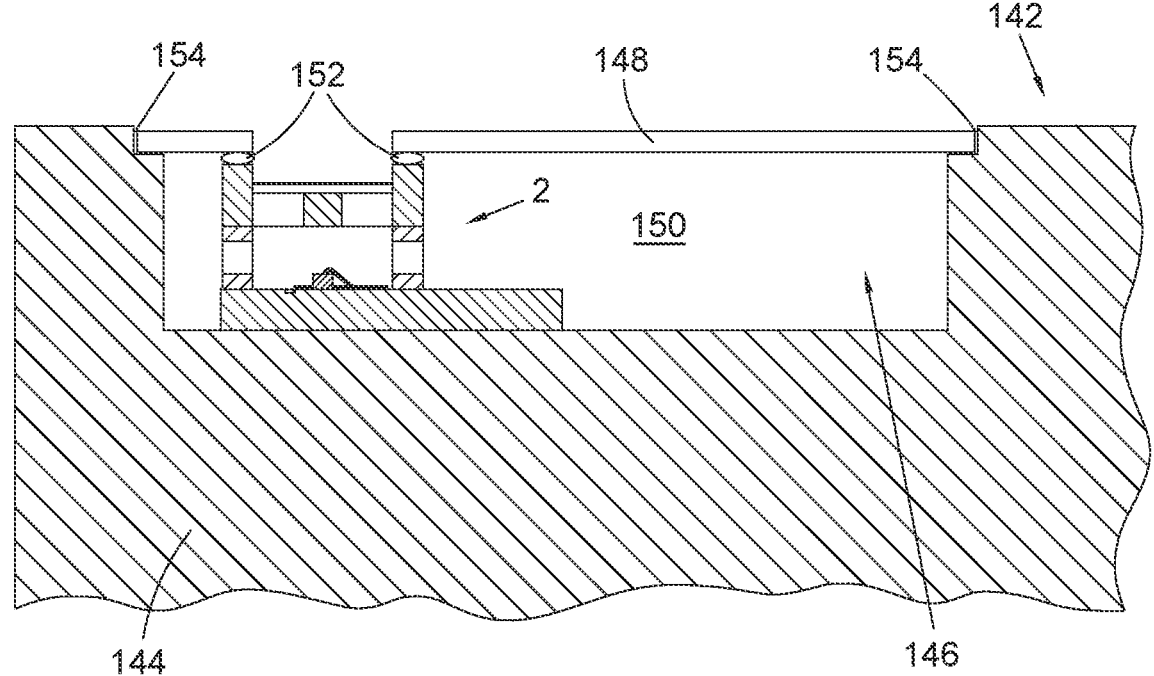
FIG. 7 shows an optical microphone assembly comprising the optical microphone module of FIG. 1 installed in a host device.

FIG. 7 shows the optical microphone module 2 of the embodiment of FIG. 2 installed in a host device 142. The host device 142 includes a housing 144 having a recess 146 formed therein. The optical microphone module 2 is mounted in the recess 146, and an enclosure 148 is positioned to cover the recess 146 so that the enclosure 148 and the recess 146 together form an acoustic cavity 150 for the optical microphone module 2, thereby forming an optical microphone assembly.

The enclosure is sealed to the optical microphone module using stress-free glue 152. The enclosure is also sealed to the periphery 154 of the recess 146. It can be seen in this example of installation in a host device that the housing of the host device (and the recess formed therein) provides a large volume that can advantageously be used to provide a large acoustic cavity for the optical microphone assembly.

Figure 8:
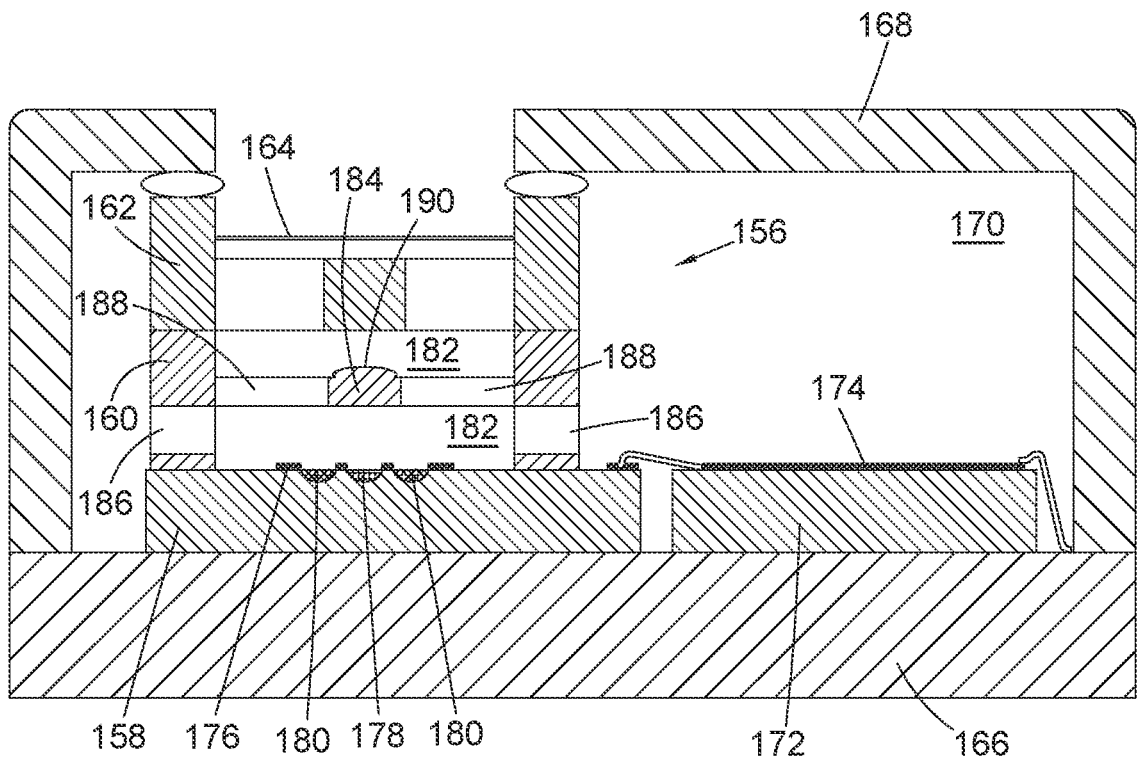
FIG. 8 shows an optical microphone assembly incorporating an optical microphone module in accordance with a fifth embodiment of the present invention.

FIG. 8 shows a further embodiment of an optical microphone module 156 in accordance with the present invention. The optical microphone module 156 comprises a semiconductor chip 158, a spacer 160, and an interferometric component 162 arranged in a stack with the spacer 160 between the semiconductor chip 158 and the interferometric component 162. The interferometric component 162 is similar to the interferometric component of the other embodiments described above and includes corresponding components, including a membrane 164, and functions in a similar manner. The optical microphone module 156 is mounted on a base 166 with an enclosure 168 forming an acoustic cavity 170.

Similarly to the embodiment of FIG. 6, a separate ASIC chip 172, comprising an ASIC 174, is provided adjacent the semiconductor chip 158. The semiconductor chip comprises an optoelectronic circuit 176. In this example, the optoelectronic circuit 176 comprises a monolithically integrated VCSEL 178 and two monolithically integrated photo detector(s) 180. It is to be understood that such a monolithically integrated VCSEL and two photo detector(s) are not essential in (or restricted to) this embodiment and variations are possible.

The semiconductor chip 158, a spacer 160, and an interferometric component 162 together define an internal cavity

182 of the stack. In this embodiment, the spacer 160 comprises a bridge structure 184 suspended in the internal cavity 182. The spacer includes air passages 186 in the main body of the spacer 160 and air passages 188 in the bridge structure 184 so that the bridge does not interrupt the fluid communication between the membrane 164 and the acoustic cavity 170. The air passages could be positioned differently in the spacer (e.g. above the bridge structure 184 in the main body of the spacer 160, in which case the bridge structure 184 may be provided without air passages therethrough (such as in the embodiment shown in FIG. 9, discussed below).

The bridge structure 184 includes a microlens 190 formed therein. In variations, other optical components may be formed in or mounted on the spacer, e.g. on the bridge structure. A microlens or other optical component provided in or on the spacer may advantageously enable manipulation of the light propagating between the light source and the membrane and/or the membrane and the photo detector(s), e.g. focusing or directing the light to improve or optimise the optical microphone performance.

Figure 9:
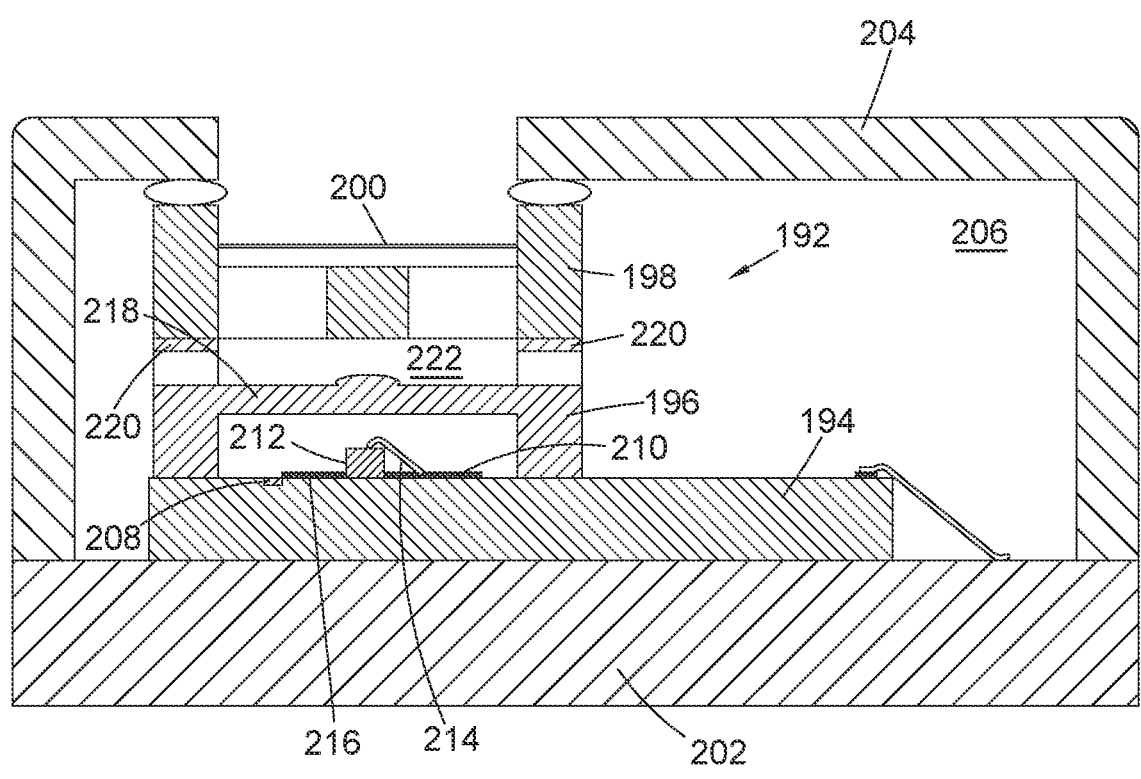
FIG. 9 shows an optical microphone assembly incorporating an optical microphone module in accordance with a sixth embodiment of the present invention.

FIG. 9 shows a further embodiment of an optical microphone module 192 in accordance with the present invention. The optical microphone module 192 comprises a semiconductor chip 194, a spacer 196, and an interferometric component 198 arranged in a stack with the spacer 196 between the semiconductor chip 194 and the interferometric component 198. The interferometric component 198 is similar to the interferometric component of the other embodiments described above and includes corresponding components, including a membrane 200 and functions in a similar manner. The optical microphone module 192 is mounted on a base 202 with an enclosure 204 forming an acoustic cavity 206.

Similarly to the embodiment of FIG. 1, the semiconductor chip 194 also comprises a photodetector 208 and an application-specific integrated circuit (ASIC) 210 adjacent a VCSEL 212 that is mounted on the semiconductor chip 194. The ASIC 210 is connected to the VCSEL 212 by wire bonding 214 and includes optoelectronic circuitry 216 which incorporates the photodetector 208. The operation of the VCSEL 212 and photodetector 208 is thereby controlled via the ASIC 210.

Similarly to the embodiment of FIG. 8, the spacer 196 comprises a bridge structure 218 suspended between the semiconductor chip 194 and the interferometric component 198. However, in this embodiment, the bridge structure 218 does not comprise air holes and forms a barrier inside the spacer. Thus the bridge structure 218, the interferometric component 198 and the upper portions 220 of the spacer together define an internal cavity 222 in the stack. Air passages are provided in the upper portions 220 of the spacer to allow fluid communication between the membrane 200 and the acoustic cavity 206.

Similarly to the embodiment of FIG. 8, a microlens is formed in the bridge structure to direct the light propagating between the VCSEL 212, the membrane 200 and the photo detector 208. One or more other optical components could be provided instead of or in addition to the microlens.

Figure 10:
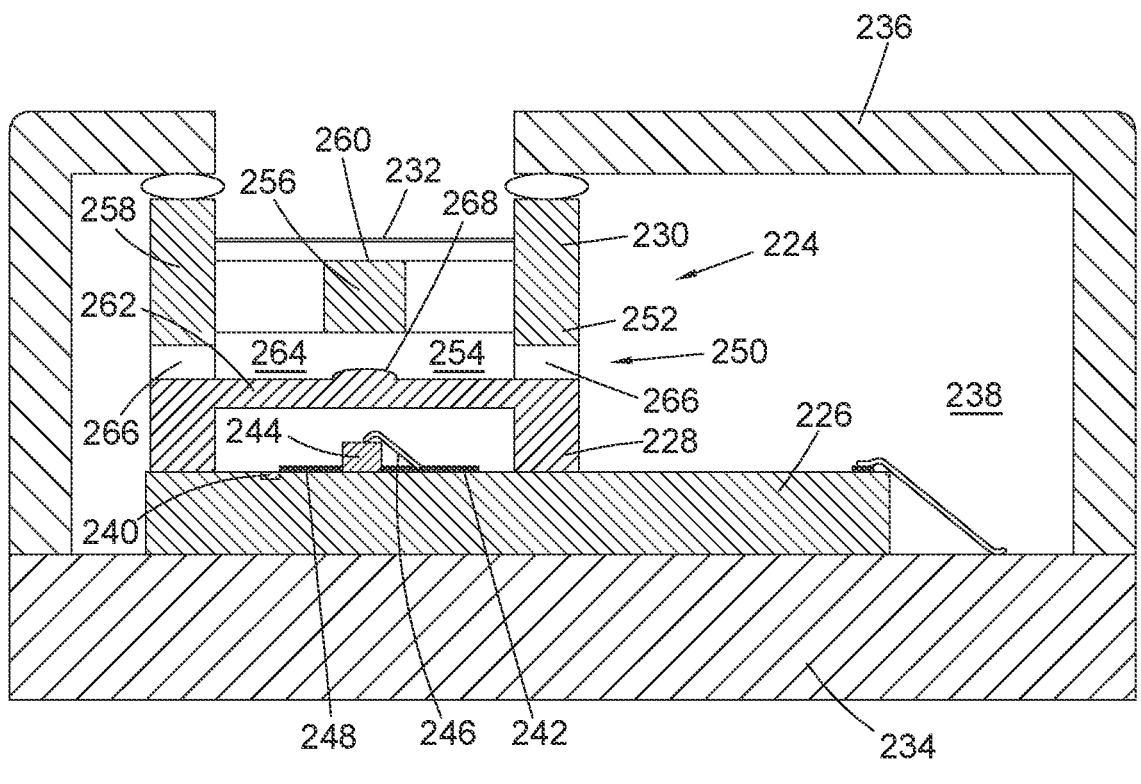
FIG. 10 shows an optical microphone assembly incorporating an optical microphone module in accordance with a seventh embodiment of the present invention.

FIG. 10 shows a further embodiment of an optical microphone module 224 in accordance with the present invention. The optical microphone module 224 comprises a semiconductor chip 226, a spacer 228, and an interferometric component 230 arranged in a stack with the spacer 228 between the semiconductor chip 226 and the interferometric component 230. The interferometric component 230 is similar to the interferometric component of the other embodiments described above and includes corresponding components, including a membrane 232 and functions in a similar manner. The optical microphone module 224 is mounted on a base 234 with an enclosure 236 forming an acoustic cavity 238.

Similarly to the embodiment of FIG. 1, the semiconductor chip 226 also comprises a photodetector 240 and an application-specific integrated circuit (ASIC) 242 adjacent a VCSEL 244 that is mounted on the semiconductor chip 226. The ASIC 242 is connected to the VCSEL 244 by wire bonding 246 and includes optoelectronic circuitry 248 which incorporates the photodetector 240. The operation of the VCSEL 244 and photodetector 240 is thereby controlled via the ASIC 242.

In contrast with the embodiments shown in the preceding Figures, in this embodiment the interferometric component 230 comprises a spacing portion 250 in the form of a peripheral wall 252 surrounding a hollow space 254 beneath a central part 256 of the substrate 258 which comprises the optical element 260.

Similarly to the embodiment of FIG. 9, the spacer 228 comprises a bridge structure 262 suspended between the semiconductor chip 226 and the interferometric component 230. In contrast with the embodiment of FIG. 9, the bridge structure 262 is formed across the top of the spacer 228, rather than inside it. The bridge structure 262 does not comprise air holes and therefore forms a barrier across the top of the spacer 228. Thus the shape of the interferometric component 230 defines an internal cavity 264 in the stack, where the bridge structure 262 forms a lower boundary wall thereof. Air passages 266 are provided in the spacing portion 250 of the interferometric component to allow fluid communication between the membrane 232 and the acoustic cavity 238.

In variations on this and other embodiments, the spacer may be shaped differently so that the shapes of the interferometric component and the spacer together define the internal cavity. For example, the bridge structure in the spacer may be positioned lower inside the spacer, or it may comprise one or more air holes, or the spacer may be provided without a bridge structure.

Similarly to the embodiments of FIGS. 8 and 9, a microlens 268 is formed in the bridge structure 262 to direct the light propagating between the VCSEL 244, the membrane 232 and the photo detector 240. One or more other optical components could be provided instead of or in addition to the microlens 268.

Figure 11:
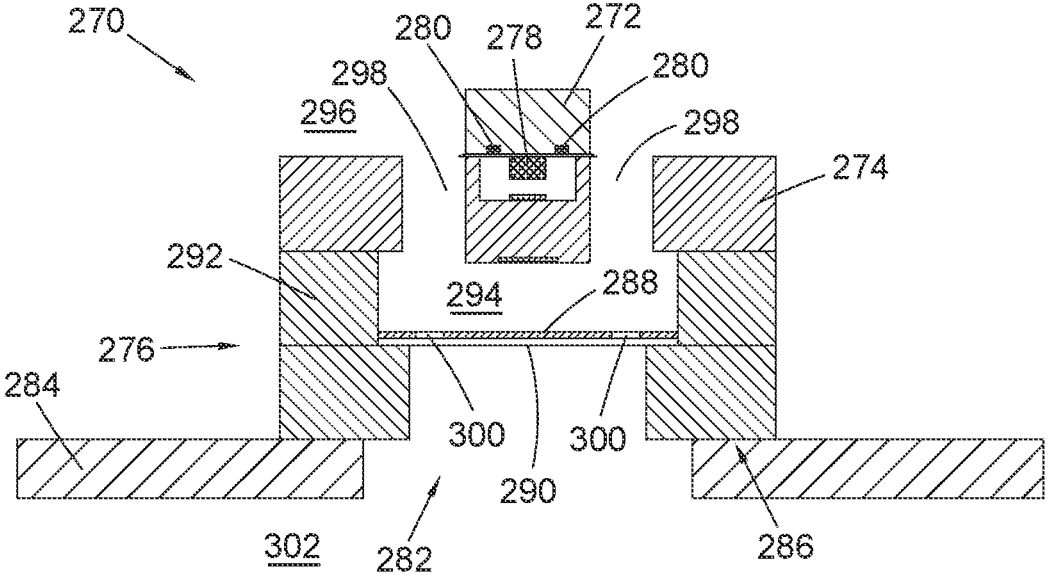
FIG. 11 shows an optical microphone module in accordance with an eighth embodiment of the present invention.

FIG. 11 shows a further embodiment of an optical microphone module 270 in accordance with the invention. Similarly to the embodiments of FIGS. 1 to 10, the optical microphone module 270 comprises a semiconductor chip 272, a spacer 274 and an interferometric component 276 arranged in a stack with the spacer 274 between the semiconductor chip 272 and the interferometric component 276. The optical microphone module 270 contains equivalent optical and electronic components (including a VCSEL 278 and photo detectors 280) to those contained in the embodiments of FIGS. 1 to 10 and operates in an equivalent manner. This embodiment shows several variations compared with the embodiments discussed above. These variations may also be provided in other embodiments, individually or in combination.

In this embodiment, an acoustic port 282 is provided in a base 284 of an optical microphone housing. The optical microphone module 270 is mounted in an inverted orientation, with an attachment region 286 of the interferometric component attached to a periphery of the acoustic port 282.

This configuration may be referred to as a 'bottom port' configuration, whereas the configuration shown in FIGS. 1 to 10 may be referred to as a 'top port' configuration.

The interferometric component 276 comprises a substrate 288 and a membrane 290. In this embodiment, the substrate 288 of the interferometric component 276 is thinner than the substrate of the embodiments of FIGS. 1 to 10. The substrate 288 has a thicker peripheral supporting region 292.

The substrate 288 (specifically the thicker supporting region 292) is shaped to define an internal cavity 294 that is in fluid communication with an exterior 296 of the stack via apertures 298 in the spacer. The exterior 296 of the stack corresponds to an acoustic cavity (back volume) of the housing. One side of the membrane 290 is in fluid communication with the internal cavity 294 via apertures 300 in the substrate. The other side of the membrane is open to the exterior 302 of the housing via the acoustic port 282.

In this embodiment, the width of the semiconductor chip 272 is smaller than the spacer 274 so that, while the semiconductor chip 272, the spacer 274 and the interferometric component 276 are still arranged in a stack with the spacer 274 between the semiconductor chip 272 and the interferometric component 276, the semiconductor chip 272 covers only a relatively small part of the surface of one side of the spacer 274.

It will be appreciated that only some possible embodiments of the invention have been described, and that other embodiments and variations are possible within the scope of the invention, which is defined by the appended claims.

The invention claimed is:

1. A method of manufacturing an optical microphone module for installation in a housing to form an optical microphone assembly, wherein the optical microphone module comprises:

an interferometric component comprising a substrate, a membrane and at least one optical element spaced from the membrane, wherein i) the at least one optical element comprises a surface of the substrate, or ii) the at least one optical element is disposed on the surface of the substrate, or iii) the at least one optical element comprises the surface of the substrate and is disposed on the surface of the substrate:

a semiconductor chip comprising an optoelectronic circuit including at least one photo detector:

a light source mounted on the semiconductor chip or integrated with the optoelectronic circuit and the at least one photo detector in the semiconductor chip; and a spacer:

the method comprising:

assembling the semiconductor chip, the spacer and the interferometric component in a stack with the spacer disposed between the semiconductor chip and the interferometric component:

wherein the light source and the at least one photo detector have respective positions on the semiconductor chip such that after the semiconductor chip, the spacer and the interferometric component have been assembled in the stack, the light source is disposed to provide light to the interferometric component such that a first portion of said light propagates along a first optical path via said interferometric component and a second portion of said light propagates along a second different optical path via said interferometric component, wherein the second optical path is different from the first optical path, thereby giving rise to an optical path difference between the first optical path and the second optical path which depends on a distance between the membrane and the at least one optical element, and the at least one photo detector is disposed to detect at least part of an interference pattern generated by said first and second portions of light dependent on said optical path difference;

wherein the stack comprises an internal cavity and at least one aperture providing a passage for air between the internal cavity and an exterior of the stack, such that the internal cavity is in fluid communication with the exterior of the stack; and wherein a first side of the membrane is in fluid communication with the exterior of the stack and a second side of the membrane is in fluid communication with the internal cavity.

2. The method of claim 1, wherein at least one of the interferometric component and the spacer has a shape that defines the internal cavity in the stack.

3. The method of claim 1, wherein at least one of the spacer and the interferometric component comprises the at least one aperture.

4. The method of claim 1, wherein the step of assembling the semiconductor chip, the spacer and the interferometric component in the stack comprises aligning at least one of the light source, the at least one photo detector, the at least one optical element or the membrane with respect to at least one other of said light source, said at least one photo detector, said at least one optical element or said membrane.

5. The method of claim 1, wherein the substrate of the interferometric component comprises one or more substrate apertures.

6. The method of claim 1, wherein the housing comprises a housing base and an enclosure, the method further comprising installing the optical microphone module in the housing to form the optical microphone assembly.

7. The method of claim 6, where the enclosure or the housing base comprises an acoustic port, the method further comprising sealing the enclosure or the housing base to the stack with the acoustic port aligned with the membrane.

8. The method of claim 1, after the semiconductor chip, the spacer and the interferometric component have been assembled in the stack, a perpendicular separation between the at least one optical element and a surface on the semiconductor chip which comprises the at least one photo detector is greater than 200 μm.

9. The method of claim 1, wherein the at least one optical element comprises a diffractive optical element.

10. A method of manufacturing an optical microphone module for installation in a housing to form an optical microphone assembly, wherein the optical microphone module comprises:

an interferometric component comprising a substrate, a membrane and at least one optical element spaced from the membrane, wherein i) the at least one optical element comprises a surface of the substrate, or ii) the at least one optical element is disposed on the surface of the substrate, or iii) the at least one optical element comprises e the surface of the substrate and is disposed on the surface of the substrate:

a semiconductor chip comprising at least one photo detector and a light source, wherein the at least one photo detector and the light source are mounted on or integrated in the semiconductor chip:

a spacer; and one or more optical components provided in or on the spacer:

the method comprising:

assembling the semiconductor chip, the spacer and the interferometric component in a stack with the spacer disposed between the semiconductor chip and the interferometric component:

wherein the light source and the at least one photo detector have respective positions on the semiconductor chip such that after the semiconductor chip, the spacer and the interferometric component have been assembled in the stack, the light source is disposed to provide light to the interferometric component such that a first portion of said light propagates along a first optical path via said interferometric component and a second portion of said light propagates along a second optical path via said interferometric component, wherein the second optical path is different from the first optical path, thereby giving rise to an optical path difference between the first optical path and the second optical path which depends on a distance between the membrane and the at least one optical element, and the at least one photo detector is disposed to detect at least part of an interference pattern generated by said first and second portions of light dependent on said optical path difference:

wherein the stack comprises an internal cavity and at least one aperture providing a passage for air between the internal cavity and an exterior of the stack, such that the internal cavity is in fluid communication with the exterior of the stack; and wherein a first side of the membrane is in fluid communication with the exterior of the stack and a second side of the membrane is in fluid communication with the internal cavity.

11. The method of claim 10, wherein the spacer comprises a supporting structure suspended in a region between the semiconductor chip and the interferometric component, wherein the one or more optical components are provided in or on the supporting structure.

12. An optical microphone module for installation in a housing to form an optical microphone assembly, the optical microphone module comprising:

an interferometric component comprising a substrate, a membrane and at least one optical element spaced from the membrane, wherein i) the at least one optical element comprises a surface of the substrate, or ii) the at least one optical element is disposed on the surface of the substrate, or iii) the at least one optical element comprises the surface of the substrate and is disposed on the surface of the substrate:

a semiconductor chip comprising an optoelectronic circuit including at least one photo detector:

a light source mounted on the semiconductor chip or integrated with the optoelectronic circuit and the at least one photo detector in the semiconductor chip; and a spacer:

wherein the semiconductor chip, the spacer and the interferometric component are assembled in a stack with the spacer disposed between the semiconductor chip and the interferometric component:

wherein the light source is arranged to provide light to the interferometric component such that a first portion of said light propagates along a first optical path via said interferometric component and a second portion of said light propagates along a second optical path via said interferometric component, wherein the second optical path is different from the first optical path, thereby giving rise to an optical path difference between the first optical path and the second optical path which depends on a distance between the membrane and the at least one optical element, and wherein the at least one photo detector is arranged to detect at least part of an interference pattern generated by said first and second portions of light dependent on said optical path difference:

wherein the stack comprises an internal cavity and at least one aperture providing a passage for air between the internal cavity and an exterior of the stack, such that the internal cavity is in fluid communication with the exterior of the stack; and wherein a first side of the membrane is in fluid communication with the exterior of the stack and a second side of the membrane is in fluid communication with the internal cavity.

13. The optical microphone module of claim 12, wherein at least one of the interferometric component and the spacer has a shape that defines the internal cavity in the stack.

14. The optical microphone module of claim 12, wherein at least one of the spacer and the interferometric component comprises the at least one aperture.

15. The optical microphone module of claim 12, wherein the interferometric component comprises one or more substrate apertures.

16. The optical microphone module of claim 12, wherein a perpendicular separation between the at least one optical element and a surface on the semiconductor chip which comprises the at least one photo detector is greater than 200 μm.

17. The optical microphone module of claim 12, wherein the at least on optical element comprises a diffractive optical element.

18. The optical microphone module of claim 12, wherein one or more optical components are provided in or on the spacer.

19. The optical microphone module of claim 18, wherein the spacer comprises a supporting structure suspended in a region between the semiconductor chip and the interferometric component, wherein the one or more optical components are provided in or on the supporting structure.

20. An optical microphone assembly or host device comprising the optical microphone module of claim 12 installed therein or thereon.

* * * * *